United States Patent [19]
Robinson et al.

[11] 3,895,732
[45] July 22, 1975

[54] ELECTRICAL JUNCTION AND SWITCH BOXES

[75] Inventors: Richard L. Robinson, Bryant; Ivan L. Volgyesy, Camanche, both of Iowa

[73] Assignee: Indian Head, Inc., New York, N.Y.

[22] Filed: Feb. 1, 1974

[21] Appl. No.: 438,686

[52] U.S. Cl. ........................ 220/3.5; 85/36; 85/85; 174/54; 174/58; 220/3.8; 220/266; 220/274; 220/284
[51] Int. Cl. ............................................. H02g 3/14
[58] Field of Search ............. 220/3.2, 3.3, 3.4, 3.5, 220/3.6, 3.8, 265, 266, 268, 274, 284, 3.9; 174/48, 52 R, 61, 63, 53, 54, 58; 85/85, 36

[56] References Cited
UNITED STATES PATENTS

| | | | |
|---|---|---|---|
| 1,962,317 | 6/1934 | Mangin | 220/284 X |
| 1,967,193 | 7/1934 | Rosenfield | 220/284 X |
| 2,038,291 | 4/1936 | Hodley | 220/3.3 |
| 2,149,719 | 3/1939 | Arnest | 220/3.4 |
| 3,438,534 | 4/1969 | Zerwes | 220/266 X |
| 3,455,201 | 7/1969 | Ryder | 85/85 X |
| 3,701,451 | 10/1972 | Schindler et al. | 220/3.9 X |
| 3,770,873 | 11/1973 | Brown | 174/58 |
| 3,773,968 | 11/1973 | Copp | 220/3.9 X |

FOREIGN PATENTS OR APPLICATIONS

| | | | |
|---|---|---|---|
| 1,568,367 | 5/1969 | France | 174/58 |

*Primary Examiner*—William I. Price
*Assistant Examiner*—Stephen Marcus
*Attorney, Agent, or Firm*—Laney, Dougherty, Hessin & Fish

[57] ABSTRACT

A molded synthetic resin box mountable in walls and ceilings for enclosing the ends of electrical conductors and providing access through a switch plate or socket to terminals or contacts connected to such conductor ends. The box has at least one integrally molded break-out window extending between two walls of the box at an acute angle to the two adjacent walls. Each window includes a removable panel retained in a surrounding opening by two bridge webs on opposite sides thereof. A pair of substantially parallel guide ribs are provided on the inner side of each panel and extend at right angles to the bridge webs. The surfaces of the panel, ribs and webs lie in planes facilitating molding of the box by a single step, straight draw molding process. Mounting screw holes are formed in the box, and spring metal screw retaining clips are mounted in the holes.

17 Claims, 10 Drawing Figures

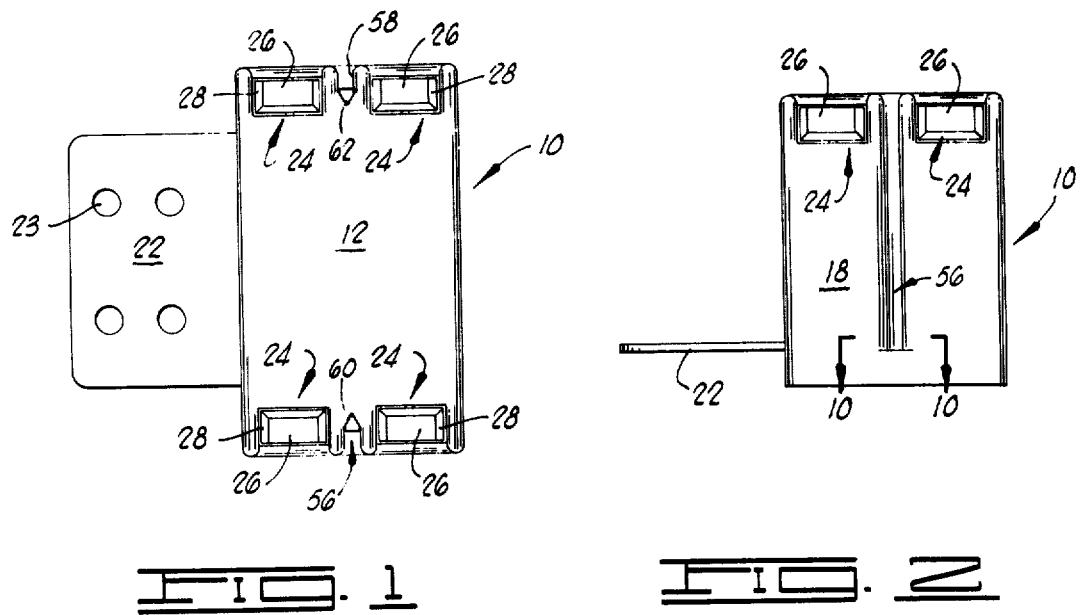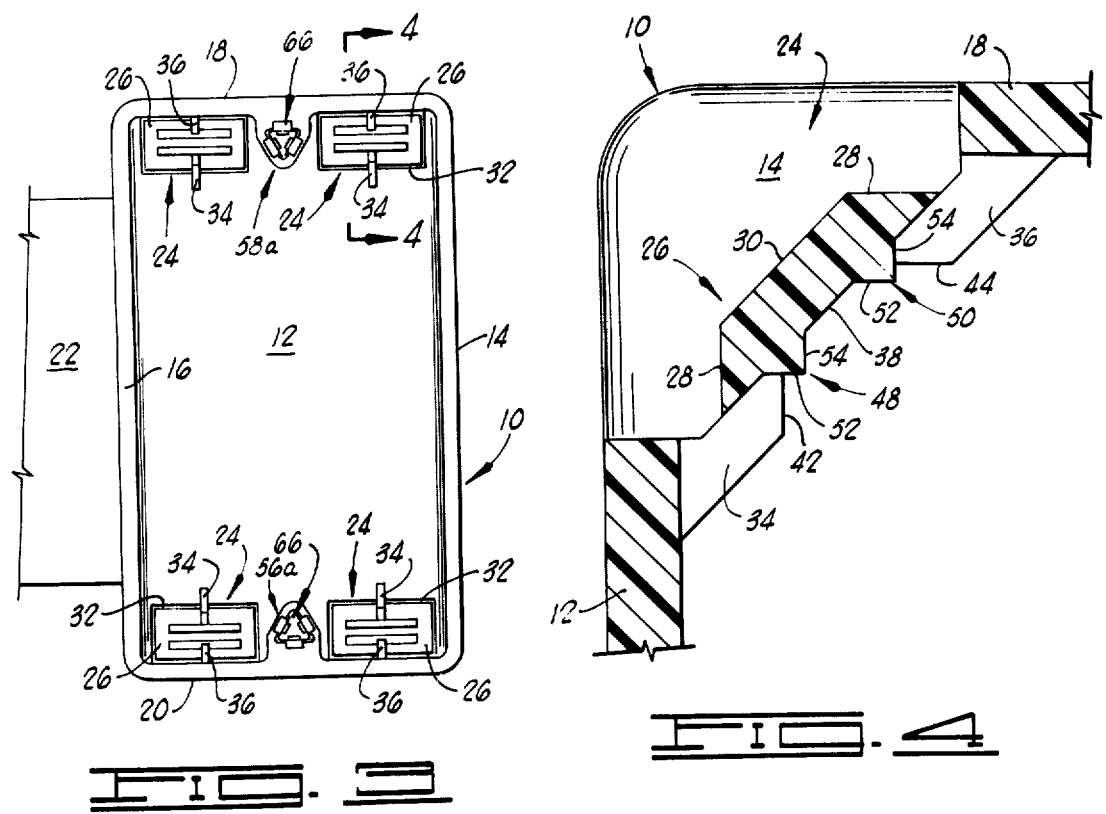

PATENTED JUL 22 1975　3,895,732
SHEET 2
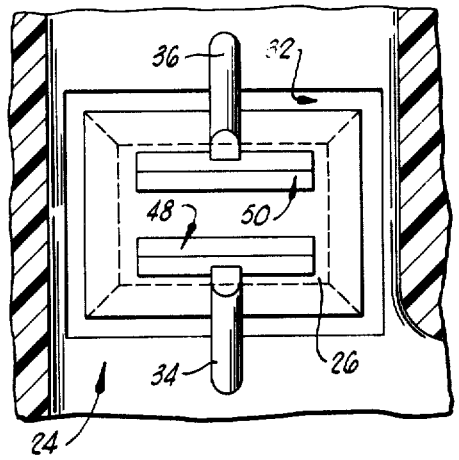
FIG. 5
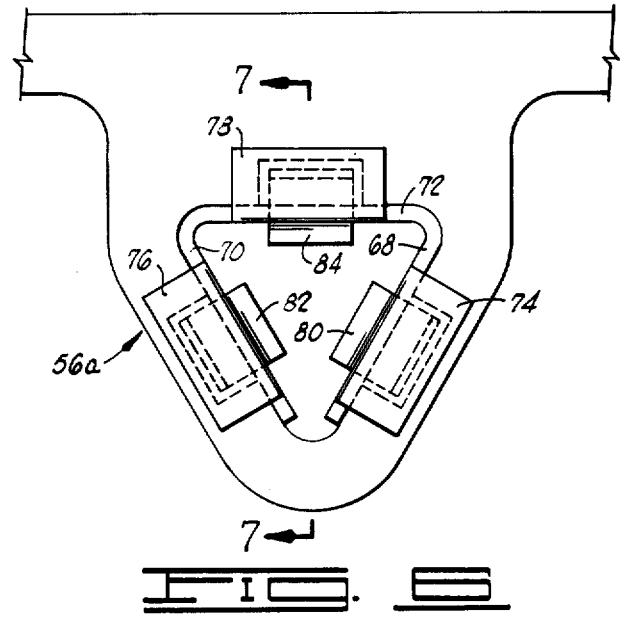
FIG. 6
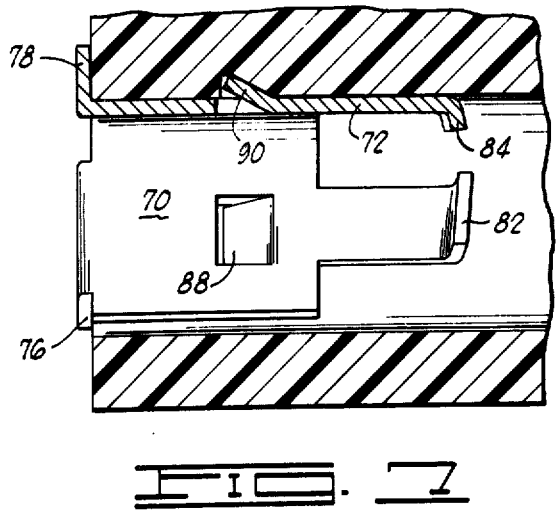
FIG. 7
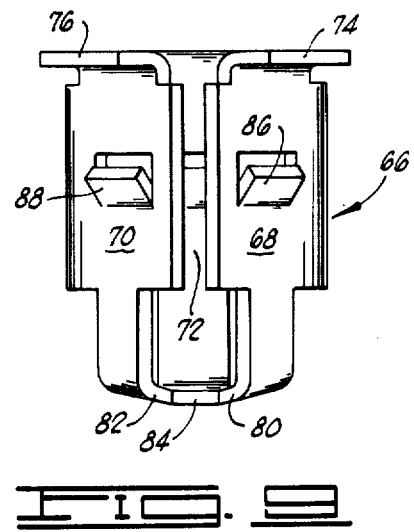
FIG. 9
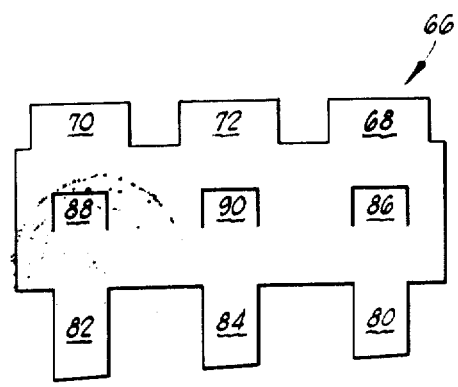
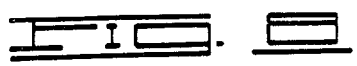
FIG. 8
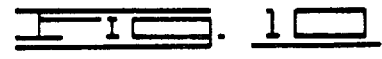
FIG. 10

ELECTRICAL JUNCTION AND SWITCH BOXES

BACKGROUND OF THE INVENTION

1. Field of the Invention

This invention relates to synthetic resin electrical junction and switch boxes which can be formed by a single step, straight draw molding process, and which include novel breakout panels or windows.

2. Brief Description of the Prior Art

Various types of electrical switch boxes or receptacles for providing accessibility to electrical service, or control of electrical service, through appropriate sockets, switch plates or quick detachable circuit making connections, are well known in the art and are widely used. These boxes are mounted in walls and ceilings during the construction of buildings, and sometimes afterwards, to provide ready access to electrical service, or additional access to service already installed. Some of the more recent types of junction and switch boxes have been molded from synthetic resin, and provide the advantage of lighter, safer and more economical construction than the metal boxes made by older methods of fabrication.

In the construction of synthetic resin electrical switch boxes of the type described, it has been a desideratum of construction methods to be able to mold the box with a minimum number of mold parts and a minimum number of molding steps. A geometrically simple box would, in most cases, provide no particular difficulty in this respect. It is usually desirable, however, in electrical switch boxes of the type under discussion to provide one or more detachable panels or window structures which can be removed from inside the box, even after it is mounted, to permit the ends of electrical conductors to be pulled into the interior of the box and connected to contacts or terminals located there. The windows or panels provided for this purpose are most desirably located at the line of intersection of two sides of the box, and are generally disposed in planes extending at an acute angle to the two adjacent sides. This complicates the geometry of the box so that it is difficult to form the box and the included pry-out panels or windows using a simple two-part mold in a one-shot molding procedure. The difficulty here experienced is further increased by the need to utilize minimal structure for retaining the panels which are later removed from the box to provide the conductor openings, so that no difficulty is experienced in prying or knocking out the panels. To mold such boxes, it is frequently necessary to use side cores with the male and female mold parts.

An improved synthetic resin electrical junction and switch box susceptible to construction by the one-shot, two-part molding process is described in U.S. Pat. application Ser. No. 243,317, filed on May 24, 1972 by Donald G. Copp now U.S. Pat. No. 3,773,968, and assigned to the assignee of the present invention. The synthetic resin box described in the Copp application works very well in practice, and can usually be constructed with no difficulty by the described one-shot molding process. It has been determined, however, that with certain types of plastic materials, and notably, polyvinyl chloride, the marked propensity of such plastics to bleed or evolve substantial quantities of hydrogen chloride gas in the course of molding the knock-out panel results in the eating away of the very fine shut-off points or line along the steel die part, which shut-off lines are used to form the space or opening surrounding the panel later to be removed by knocking or prying it out in the manner previously described. This attack on the steel molds by the hydrogen chloride gas, resulting in the eating away of the sharp lines used for shutting off the plastic flow around the knock-out panel, permits the plastic to move between the mold parts at this location so that the panel becomes merged with or molded integrally with the adjacent side walls of the box ("flashes"). It is then extremely difficult to knock out or remove the panel when the electrical conductors are to be pulled through the openings in the box. Because of this difficulty, it has been found that the knock-out panel construction proposed in U.S. Pat. application Ser. No. 243,317 is less than optimum when polyvinyl chloride is to be the material of construction, and boxes made of that material and molded by a one-shot molding process frequently become unsatisfactory in later usage because of the previous deterioration of the mold under attack by the corrosive hydrogen chloride gas over an extended period of time, resulting in undesirable merging of the knock-out panel with the adjacent walls of the box.

Many of the types of synthetic resin junction box constructions which have been heretofore proposed have provided elongated holes formed in ears molded out of the side walls of such boxes, such holes being for the purpose of accommodating screw type fastening elements extended through a switch plate or the like fastened to the open front side of the box as the assembly is completed. The total time of installation of such switch and junction boxes to a completed state ready for service has been in large part made up of the time required to screw into these holes, the screws used for securement of the switch plate. There are normally two such screws utilized, but in many cases, additional screws are employed, and the consequent time investment required for assembly is substantially increased.

BRIEF DESCRIPTION OF THE PRESENT INVENTION

The present invention is directed to molded synthetic resin boxes suitable for use as electrical junction and switch boxes and susceptible to one-shot molding from polyvinyl chloride, as well as other synthetic resin materials. The construction of the synthetic resin box of the invention is such that the box includes at least one integrally molded break-out window which includes a panel lying in a plane extending at an acute angle to two adjacent sides of the box, which panel is surrounded by a gap or space separating it from the surrounding portions of the box. Two bridge webs hold the panel in position in the window opening and extend between adjacent sides of the box, and a pair of parallel guide ribs are provided on the inside surface of the removable panel. The described construction assures retention of the panel in its window closing position until it is pushed out by the use of a screwdriver or other instrument used to apply a force at a position on the panel between the two parallel guide ribs, and yet assures that flashing or bleeding of plastic material across eroded portions of the shut-off lines on the mold parts will not fill the space or gap left open around the panel to permit it to be removed from the window opening in the box.

The boxes of the invention, in a preferred embodiment, further include screw retaining clips pressed into screw holes formed in the box, and facilitating rapid securement of a switch plate or other covering member to the open side of the box.

From the foregoing description of the invention, it will be apparent that it is a major object of the present invention to provide an integrally molded, synthetic resin electrical switch box which can be quickly and easily formed from polyvinyl chloride, and such that the same mold parts can be employed for such molding operation over an extended period of time without destruction or loss of the important properties and characteristics of the box which permit it to be effectively employed for receiving electrical conductors through openings formed in the side of the box.

An additional object of the present invention is to provide a synthetic resin junction or switch box for providing contacts allowing establishment of electrical service through the box, which box facilitates, through its construction, the quick and simple mounting of switch plates across the open side thereof.

A further object of the invention is to provide a synthetic resin electrical junction or switch box having a geometry such that it can be quickly and easily molded as an integral structure by a one-shot molding process, using only two mold parts, which box has one or more knock-out panels provided in the box.

A further object of the invention is to provide a synthetic resin, integrally molded electrical junction or switch box which can be quickly and easily placed in position ready for use, and which has a durable, long-lasting and effective service life.

Other objects and advantages of the invention will become apparent as the following detailed description of the preferred embodiment of the invention is read in conjunction with the accompanying drawings which illustrate the invention.

BRIEF DESCRIPTION OF THE DRAWINGS

FIG. 1 is a front elevation view of a synthetic resin switch box constructed in accordance with the present invention.

FIG. 2 is a bottom plan view of the synthetic resin switch box shown in FIG. 1.

FIG. 3 is a rear elevation view of the synthetic resin switch box shown in FIG. 1, and showing the manner in which the spring metal screw retaining clips are positioned in the switch box for the reception of screws employed to secure a switch plate to the box.

FIG. 4 is an enlarged sectional view taken along line 4—4 of FIG. 3, and illustrating the geometry and construction of one of the break-out windows provided in a synthetic resin switch box made in accordance with the present invention.

FIG. 5 is an enlarged detail view of one of the break-out windows used in the switch box of the invention, and of a portion of the surrrounding switch box, showing the window as it appears when viewed from the inside of the switch box.

FIG. 6 is an enlarged detail view illustrating the manner in which one of the spring metal screw retaining clips is pressed into and retained in a screw receiving hole molded in the switch box.

FIG. 7 is a sectional view taken along line 7—7 of FIG. 6.

FIG. 8 is a plan view of a blank employed in the formation of the spring metal screw retaining clip used in a preferred embodiment of the present invention.

FIG. 9 is a front elevation view of one of the spring metal screw retaining clips utilized in a preferred embodiment of the present invention.

FIG. 10 is a sectional view taken along line 10—10 of FIG. 2.

DETAILED DESCRIPTION OF A PREFERRED EMBODIMENT OF THE INVENTION

Referring initially to FIGS. 1-3 of the drawings, a switch box constructed in accordance with the present invention is designated generally by reference numeral 10. The box 10 includes a plurality of walls defining an enclosure open at one side thereof, and in the illustrated embodiment of the invention, these walls include a back wall 12, a pair of side walls 14 and 16, a top wall 18 and a bottom wall 20. The described walls are all substantially monoplanar and are connected to each other at substantially a right angle so that the overall configuration of the box 10 is that of a right parallelepiped. Reference to FIG. 3 will indicate that the side of the box 10 opposite the back wall 12 is open as the box is molded, and, as will be hereinafter explained, and as is well understood at the art, this open side of the box 10 is later closed by the securement to the box of a switch plate or other suitable closure plate, using screws or other suitable fastening devices.

Molded integrally with the box 10 and projecting from the side 16 thereof is a mounting plate 22 having a plurality of holes or apertures 23 formed therethrough and adapted for mounting the box 10 in a wall, ceiling or other conventional location. The mounting plate, as such, does not constitute a novel subassembly or element of the present invention, but is a portion of the overall combination constituting the invention.

In the use of synthetic resin junction and switch boxes of the type typified by the box 10 for the purpose of providing electrical service outlets in walls, ceilings and the like, it is conventional practice to provide some type of opening in the walls of the switch box to permit the end portions of electrical conductors to be pulled from the outside to the inside of the box, and there connected to terminals or contacts inside the box. In this way, after a slotted switch plate or similar structure has been mounted on the open side of the box, a male plug or similar contacting element can be plugged into the switch plate so that contact is established with the contacts or terminals inside the box, and an electrical circuit is completed through the conductor connected to the plug or the like.

To facilitate the extension of the end portions of conductors from the outside to the inside of the box 10 for connection to the contacts or terminals located therein, the box of the present invention has a plurality of break-out windows formed therein. In the illustrated embodiment, four of such windows have been illustrated, and are each designated generally by reference numeral 24. It will be understood, however, that fewer or more of the break-out windows can be provided in such junction and switch boxes, depending on the type of electrical service to be provided, and the particular needs of a given installation situation. Since each of the break-out windows 24 of the present invention is identically constructed, reference will be made in the description of these windows to a single one of them, with the understanding that such description applies with equal accuracy to the construction of the other break-out windows.

Referring to FIGS. 1–4 of the drawings, and particularly to FIG. 4 for illustration of detail, each of the break-out windows 24 includes a removable panel 26 which is substantially rectangular in configuration and has tapered, outwardly facing side edges 28 formed around the four sides thereof. Reference to the enlarged detail view of one of the molded break-out windows as illustrated in FIG. 4 will reveal that the removable panel 26 extends in a plane which projects at an acute angle to the adjacent walls of the box 10, which in FIG. 4 are the top wall 18 and the back wall 12. Preferably, the described angle is an angle of between 30° and 60°. The removable panel 26 is further shown by the detail illustration in FIG. 4 to be geometrically configured and oriented so that its side edges 28 extend in planes lying in substantial parallelism to the planes occupied by the nearest adjacent wall 12 or 18. The exposed outer face 30 of the removable panel 26 preferably extends at an equal angle to the tapered side edges 28, and in a preferred embodiment of the invention, the plane occupied by the outer surface 30 extends at substantially 45° with respect to the top wall 18 and the side wall 12.

As will be perceived in referring to FIGS. 1–5 of the drawings, and particularly FIGS. 4 and 5, the removable panel 26 forming a part of each of the break-out windows 24 is centered in an opening formed through the box 10 and designated generally in FIG. 5 by reference numeral 32. The slot or opening 32 extends completely around the removable panel 26, and separates the panel from the adjacent side walls of the box. In the preferred construction of the molded synthetic resin boxes of the invention, the gap or opening 32 has a width of between 0.040 inch and 0.060 inch, and this assures that any erosion or wearing away of the shut-off lines of the die which prevent the intrusion of synthetic resin into this gap or space during the molding process will be obviated or reduced over an extended period of time.

In order to retain the removable panels 26 in the illustrated location until such time as these panels are intentionally removed to permit the end portions of electrical conductors to be pulled through the opening left upon removal, a pair of bridge webs 34 and 36 are formed during the one-shot molding process, and form bridges extending between the removable panel 26 and the top wall 18 and the back wall 12 of the box. The bridge webs 34 are relatively thin or small in transverse dimension, and have one of their ends molded into the adjacent side wall of the box, and the other end merged by molding with the back or inside surface 38 of the removable panel 26.

It will be perceived that the inside surface 38 of the removable panel 26 extends substantially parallel to the outside surface 30, and thus extends at an angle of substantially 45° with respect to the top wall 18 and the side wall 12. The same relationship characterizes the exposed surfaces of the bridge webs 34 and 36 except for the terminal surface most nearly adjacent the removable panel 30. In the case of these surfaces, designated by reference numeral 42 in the case of the bridge web 34, and 44 in the case of the bridge web 36, these surfaces extend substantially parallel to the nearest respective wall of the box so that the surface 42 is substantially parallel to the plane of the back wall 12, and the surface 44 is substantially parallel to the plane of the top wall 18. It will further be noted in referring to FIG. 5 that the interior surface of each of the bridge webs 34 and 36 is preferably semi-cylindrical in configuration, this effect being accomplished by forming a rounded bottom in the bridge recesses formed in the mold used for forming the bridge webs.

FIGS. 3–5 best illustrate the location and configuration of a pair of guide ribs 48 and 50 formed on the back or inside surface 38 of the removable panel 26. The guide ribs 48 and 50 extend substantially parallel to each other as shown in FIG. 5, and each is of substantially right triangular cross-sectional configuration as illustrated in FIG. 4. Thus, each of the guide ribs 48 and 50 has a pair of exposed surfaces 52 and 54 facing toward the inside of the box 10, with these surfaces extending at a right angle to each other, and extending, respectively, at a right angle to the nearest adjacent wall of the box. This configuration facilitates the molding of the box by the one-shot, two mold part procedure to which reference has hereinbefore been made.

The spacing between the guide ribs 48 and 50 is selected to facilitate the placement between the guide ribs of the point of a screwdriver, or similar implement, so that the removable panel 26 may easily be snapped or broken out of the box at a time when the installer wishes to extend the end portions of electrical conductors from the outside to the inside of the box. It will further be noted in referring to FIGS. 4 and 5 of the drawing that the bridge webs 34 and 36, in addition to being molded integrally over a portion of their length with the back surface 38 of the removable panel 26, also have an end portion which is merged with, and therefore joined to, a median portion of the two guide ribs 48 and 50. This assures that the bridge webs 34 and 36 will afford sufficient retention strength to assure that the removable panels 26 will remain in position and not be knocked loose by inadvertent dropping or rough handling of the box at a time prior to the intentional removal of these panels by the installing workmen.

In the illustrated embodiment of the synthetic resin box constructed in accordance with the present invention, a pair of elongated, inwardly turned channels 56 and 58 are formed in the top wall 18 and bottom wall 20 of the box. The channels 56 and 58 are of a cross-sectional configuration best illustrated in FIG. 10 of the drawings, and are molded by turning inwardly the top wall 18 and bottom wall 20 to form a deep indentation extending over a major portion of the length of these two walls. Adjacent those edges of the top wall 18 and bottom wall 20 of the box which lies nearest the open side of the box, the respective channels 56 and 58 are each closed to provide a tubular portion 56a and 58a having a screw hole 60 and 62, respectively, formed therethrough.

In constructions of molded synthetic resin switch boxes provided in prior art practice, the holes 60 and 62 have been provided for the reception of screws, or similar fastening elements, used for securing a switch plate, or similar closure structure, across the open side of the box. The threaded ends of the screws were simply extended into the holes 60 and 62, and the workman installing the box then screwed the screws into these holes until the switch plate was made fast. This required a number of turns of the screw, and generally constituted no small portion of the total time required for completing the installation of the box to a status ready for service.

In accordance with the present invention, a substantial part of this installation time required for mounting the switch plate on the open face of the box 10 has been reduced by the provision of screw retaining clips which are pressed into the holes 60 and 62 in the course of manufacture of the box. In referring to FIGS. 6 and 10 of the drawings, it will be perceived that the holes 60 and 62 are of substantially triangular configuration. In this form, each of the holes is adapted to receive a spring metal screw retaining clip of the type illustrated in FIG. 9 of the drawings, and designated generally by reference numeral 66. Each retaining clip 66 can be made from a blank of the type illustrated in FIG. 8, and thus includes three side portions 68, 70 and 72 which are integrally connected through bend lines, so that each of the side portions extends at an angle of about 60° with respect to the adjacent side portion (see FIG. 6).

At the upper end of each of the side portions 68, 70 and 72, the spring metal is bent over at a right angle to provide a limiting tab, with these limiting tabs being designated by reference numerals 74, 76 and 78 in FIGS. 6, 8 and 9 of the drawings. At the lower end of each of the side portions 68, 70 and 72, each side portion is bent inwardly in a reverse direction from the bend of the tab plates 74, 76 and 78 to form an inwardly extending screw engaging flange. These flanges are designated by reference numerals 80, 82 and 84, and are illustrated in FIGS. 7–9. Finally, in the formation of each of the spring metal screw retaining clips 66, a barb, tine or tongue is pressed out of each of the side portions 68, 70 and 72 and projects upwardly toward the respective limiting tab 74, 76 and 78, and at an acute angle to the major plane of the respective side portion from which it is pressed. These tines are designated by reference numerals 86, 88 and 90 in the drawings.

With the screw retaining clips 66 made up in the manner described, they are then pressed into the openings of the respective screw holes 60 and 62 formed in the tubular portions 56a and 58a of the channels 56 and 58. Mounted in one of the screw holes 60, the screw retaining clip 66 occupies the position best illustrated in FIGS. 6 and 7 of the drawings. It will be perceived that in this position, the barbs 86, 88 and 90 bite into the synthetic resin forming the side walls of the screw holes, and extend at an angle to the faces of the box such that the clips are retained against pulling out of the holes. It will also be noted, in referring to FIGS. 7 and 9 of the drawings, that the in-turned screw engaging flanges 80, 82 and 84 of the screw retaining clips define between them, a small central aperture or passageway through which the point of the screw may be extended, but which is not sufficiently large to permit the enlarged portion of the threaded shank of the screw to be extended without engagement with these flanges.

UTILITY AND OPERATION OF THE INVENTION

The electrical junction and switch boxes constructed in accordance with the present invention can be easily and accurately molded, using a one-shot molding procedure in which two mold parts are employed in a cooperating reciprocating motion with the result that the boxes are formed with the break-out windows in the illustrated positions. The surfaces of the removable panel 26 and the bridge webs 36 which hold it in place, as well as the surfaces of the guide ribs 48 and 50, are oriented with respect to the mold faces so that no difficulty is encountered in molding and no side cores are required. The slot or opening 32 formed completely around the removable panel 26, except for the location of the bridge webs 36, is sufficiently wide that erosion or eating away of the mold shut-off lines or surfaces at these locations as a result of attack by acidic hydrogen chloride gas does not become a problem over extended usages of the mold parts. In other words, the definition afforded by the molds does not become reduced by corrosive attack to the point where flashing of the plastic can occur to fill the opening 32, and prevent the movable panel 26 from being quickly and easily snapped out when it is desired to open the break-out windows at the time of installation of the box. Repeated moldings of polyvinyl chloride boxes have been achieved, with the described geometric arrangement of the break-out windows constructed in accordance with the present invention.

The windows, as thus constructed, also facilitate the rapid and foolproof removal of the panels 26 from the window openings when the box has been secured at the desired location in a wall or ceiling. The installing workman has merely to place the pointed end of a screwdriver or any other implement having a pointed end thereon between the guide ribs 48–50 and press outwardly. The removable panel will snap out of the opening 32 as the bridge webs 36 yield to the pressure applied by the screwdriver. It should also be here noted that on occasion, a workman will, often through caprice, undertake to remove the panel 26 on the break-out windows 24 prior to installation of the box, and will try to do so from the outside of the box. This can be accomplished, if so attempted, by inserting the edge of the screwdriver in the relatively wide opening 32 and prying the removable panel out, concurrently rupturing the bridge webs 36.

After the box 10 has been mounted by use of the mounting plate 22 in the opening provided for it in the wall or ceiling, and the ends of electrical conductors have been pulled through the break-out windows after removal of the panels 26, installation of the box 10 is completed by securement of a switch panel closure plate across the open side thereof. This is accomplished by extending screws through openings or holes formed in the switch plate in a position of registry or alignment with the tubular portions 56a and 58a defining the screw holes 60 and 62. The pointed ends of each screw passes into the screw hole until the shank of the screw, carrying the thread thereon, engages the inwardly extending, screw engaging flanges 80, 82 and 84. The thread, upon engagement with these flanges, will then lead or force the screw inwardly in the screw hole, and adequate retention and engagement is generally obtained with only three or four turns of the screw. There is thus effected a substantial saving in time over that which would be required to install the switch plate, using screws screwed into the screw holes in the conventional manner. In such cases, many turns of the screw must be applied before the screw is fully seated in the screw hole.

From the foregoing description of a preferred embodiment of the invention, it will be apparent that various changes and innovations can be effected in the illustrated and described structure without departure from the basic principles of the invention. Changes of this type, which continue to rely upon such principles,

What is claimed is:

1. A molded synthetic resin electrical service box comprising:
   at least two walls intersecting each other at substantially a right angle; and
   a break-out window extending between said intersecting walls at an acute angle to each of said intersecting walls, said break-out window comprising:
   a removable panel in a surrounding opening spacing the panel from the remainder of the box;
   a pair of bridge webs bridging across said opening and connecting opposite sides of the panel with said two intersecting walls; and
   a pair of guide ribs on the side of said removable panel facing the inside of said box and defining a tool receiving space therebetween.

2. A molded synthetic resin electrical service box as defined in claim 1 wherein said removable panel is a frustum of a pyramid having
   an exposed outer face lying in a plane extending at an acute angle to said intersecting side walls;
   an inside surface extending substantially parallel to said outer face; and
   side edges between the outer face and inside surface, and each extending substantially parallel to one of said two intersecting walls.

3. A molded synthetic resin electrical service box as defined in claim 1 wherein said bridge webs are aligned with each other and each is connected to, and molded integrally with, one of said guide ribs.

4. A molded synthetic resin electrical service box as defined in claim 1 wherein said opening surrounding said removable panel has a width at all points therealong, as measured between the panel and the box, of from about 0.04 inch to about 0.06 inch.

5. A molded synthetic resin electrical service box as defined in claim 1 wherein said guide ribs extend parallel to each other, and each of said guide ribs is of triangular cross-section having two exposed sides each extending parallel to one of said two intersecting walls.

6. A molded synthetic resin electrical service box as defined in claim 2 wherein said bridge webs are aligned with each other and each is connected to, and molded integrally with, one of said guide ribs.

7. A molded synthetic resin electrical service box as defined in claim 2 wherein said opening surrounding said removable panel has a width at all points therealong, as measured between the panel and the box, of from about 0.04 inch to about 0.06 inch.

8. A molded synthetic resin electrical service box as defined in claim 2 wherein said guide ribs extend parallel to eah other, and each of said guide ribs is of triangular cross-section having two exposed sides each extending parallel to one of said two intersecting walls.

9. A molded synthetic resin electrical service box defined in claim 6 wherein said opening surrounding said removable panel has a width at all points therealong, as measured between the panel and the box, of from about 0.04 inch to about 0.06 inch.

10. A molded synthetic resin electrical service box as defined in claim 9 wherein said guide ribs extend parallel to each other, and each of said guide ribs is of triangular cross-section having two exposed sides each extending parallel to one of said two intersecting walls.

11. A molded synthetic resin electrical service box as defined in claim 1 wherein said box is open at one side thereof, and said box is further characterized in including:
    screw hole defining tubular portions on walls of the box at a location adjacent and facing the open side thereof; and
    screw retaining clips pressed into said tubular portions.

12. A molded synthetic resin electrical service box as defined in claim 11 wherein each of said screw retaining clips includes
    barbs impaling the synthetic resin of the box constituting the respective tubular portion in which the clip is located; and
    cooperating screw engaging flanges adapted to collectively engage the threads of a screw.

13. A molded synthetic resin electrical service box as defined in claim 11 wherein each of said screw retaining clips is a metal member bent to a triangular cross-sectional configuration to provide three opposite side portions, and each of said clips further comprises:
    means for fixing the position of the clip in one of said tubular portions by engagement therewith; and
    means for engaging the threads of a screw extended into said clip between said side portions.

14. A molded synthetic resin electrical service box as defined in claim 13 wherein said removable panel is a frustum of a pyramid having
    an exposed outer face lying in a plane extending at an acute angle to said intersecting side walls;
    an inside surface extending substantially parallel to said outer face; and
    side edges between the outer face and inside surface, and each extending substantially parallel to one of said two intersecting walls.

15. A molded synthetic resin electrical service box as defined in claim 14 wherein said bridge webs are aligned with each other and each is connected to, and molded integrally with, one of said guide ribs.

16. A molded synthetic resin electrical service box as defined in claim 14 wherein said opening surrounding said removable panel has a width at all points therealong, as measured between the panel and the box, of from about 0.04 inch to about 0.06 inch.

17. A molded synthetic resin electrical service box as defined in claim 16 wherein said guide ribs extend parallel to each other, and each of said guide ribs is of triangular cross-section having two exposed sides each extending parallel to one of said two intersecting walls.

* * * * *